Jan. 4, 1938.  C. T. FISH  2,104,343
ATTACHMENT FOR LAWN MOWERS
Filed Jan. 2, 1937
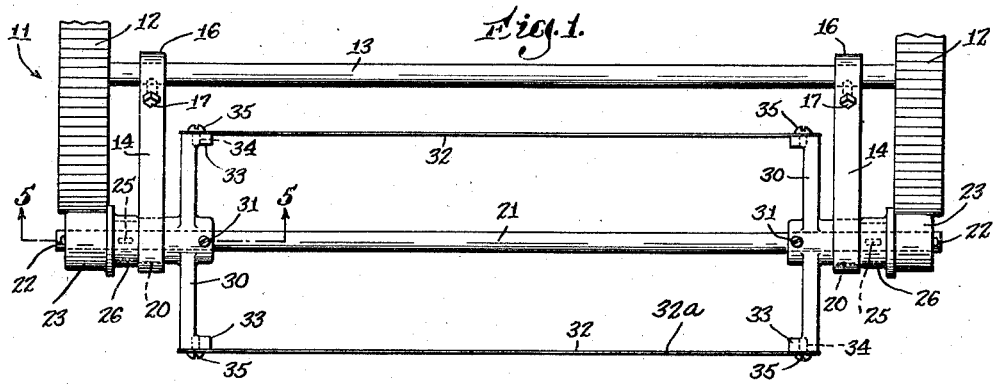
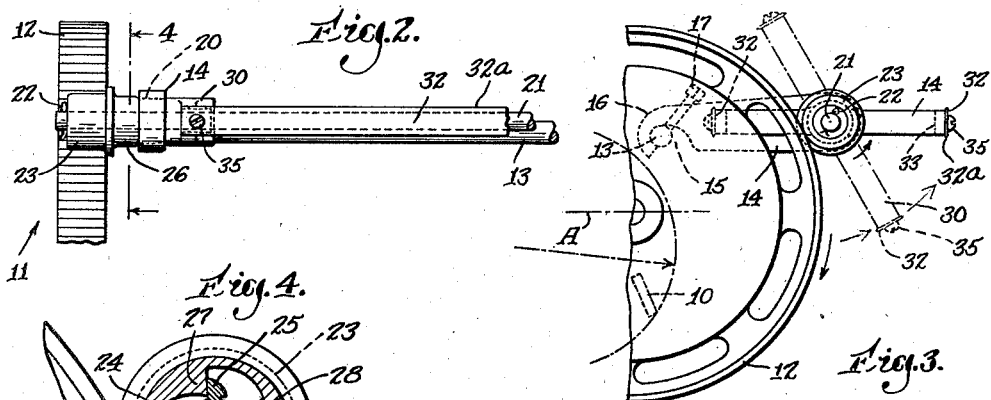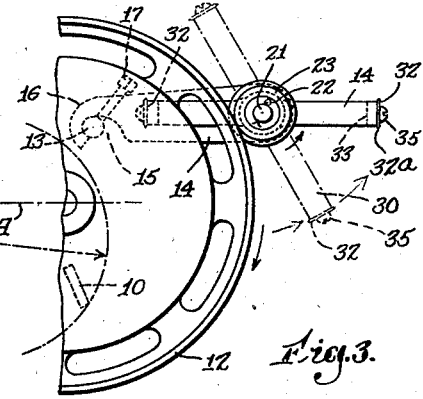
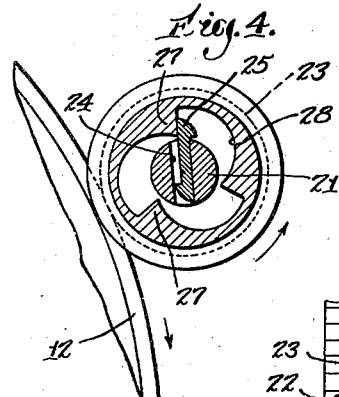
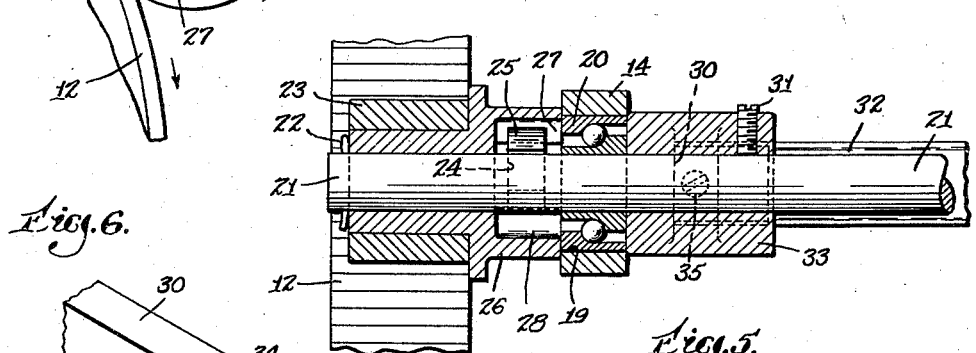
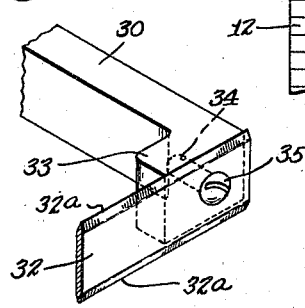
Inventor
Charles T. Fish
by Harold E. Cole
Attorney Patented Jan. 4, 1938

2,104,343

UNITED STATES PATENT OFFICE 2,104,343

ATTACHMENT FOR LAWN MOWERS

Charles T. Fish, Scituate, Mass.

Application January 2, 1937, Serial No. 118,883

1 Claim. (Cl. 56—238)

This invention relates to an attachment for lawn mowers.

Weeds in the lawn such as blackheads, dandelions and tall grass commonly grow too tall to be cut by the ordinary lawn mower, with the result that they make the lawn unsightly. To cut these high weeds special mowers and attachments to lawn mowers have been invented, which I am well aware of. The great need, however, has been to bring a device for cutting such weeds within the price range of the ordinary man, and one which can be operated without any extra labor on his part, and can be attached to his lawn mower in a few moments and without any expense. It has been my chief object to provide an attachment for lawn mowers which is so simple in construction that it can be sold for a fraction of the price paid for a lawn mower, and to provide attaching means which are so simple that my device can be attached or detached to a lawn mower without making any change whatsoever in the lawn mower and which will automatically set itself, upon being attached, in efficient cutting position. Another object is to provide cutting blades which are inexpensive, and which can be readily removed from my attachment for sharpening and just as readily placed in cutting position again.

The foregoing and other objects which will appear as the nature of the invention is better understood, may be accomplished by a construction, combination and operative arrangement of parts such as is disclosed by the drawing and specification. The nature of the invention is such as to render it susceptible to various changes and modifications, and, therefore, I am not to be limited to said disclosure; but am entitled to all such changes therefrom as fall within the scope of my claim.

In the drawing:

Figure 1 is a plan view of my attachment shown fastened to a lawn mower.

Figure 2 is a partial front elevational view of my attachment fastened to a lawn mower.

Figure 3 is a partial end elevational view of my attachment fastened to a lawn mower.

Figure 4 is a sectional view taken on the line 4—4 of Figure 2 to illustrate the clutch means for the shaft and friction wheel.

Figure 5 is a sectional view taken on the line 5—5 of Figure 1.

Figure 6 is a perspective view, broken away, showing the cutting blade and means for holding it in place.

My attachment is adapted to be readily attached to an ordinary lawn mower 11, which has a cutter reel 10, a pair of drive wheels 12 and a front bar or tie rod 13 as usual. My attachment has a pair of supporting arms 14 each having a cut-out or recessed portion 15 near one end and terminating in a hooked portion 16 extending part way around said front bar 13, said arms being held to said front bar 13 by means of set screws 17, although other fastening means such as a bolt and nut, et cetera, could be used, the object being to make a quick and simple connection of my attachment to said front bar 13 without having to make any changes in said bar. At the other end of each said arm 14 is an opening 19 into which a ball bearing member 20 commonly known is fitted. A shaft 21 for my device, which rotates during the cutting operation, is journaled in said ball bearing member 20, and is held at its ends by a cotter pin 22 which is outside a friction wheel 23 which normally bears against and is driven by said lawn mower wheel 12, there being one for each said lawn mower wheel. Said friction wheel 23 is purposely positioned so that it is at the front of and bears against the upper portion of the lawn mower wheel 12, being definitely above the horizontal axial line A of said lawn mower wheel. Near each end of said shaft 21 there is a slot 24 extending through said shaft into which a dog 25 fits and projects beyond the surface of said shaft, serving a purpose to be described. Said friction wheel 23 has a hub portion 26 within which are tooth members 27 which serve as a clutch in conjunction with said dog 25 projecting from said shaft 21, so that when a said lawn mower wheel 12 rotates in a rearward direction as when said lawn mower is pulled rearwardly, said shaft 21 is not rotated because said clutch is not operative, consequently there is then no operative connection between said shaft 21 and said friction wheel 23. This is due to the cam surfaces 28 formed inside said hub 26, which surfaces extend from said tooth member 27 as illustrated in Figure 4 of the drawing, over which said cam surfaces 28, said dog 25 slides or wipes along upon reverse rotation of a said lawn mower wheel 12. During the normal or forward rotation of said lawn mower wheel 12 said dog 25 is moved against one of said tooth members 27, consequently the rotation of said friction wheel 23 rotates said shaft 21 with it.

Mounted on said shaft 21 is a pair of brackets 30 which are held in position on said shaft by set screws 31. Said shaft carries the cutting blades 32 of my device which are fastened to said brackets 30 at each end by screws 35 which screw into a tapped hole 34 tapped into a boss 33 formed at the end of each said bracket 30.

It should be noted that there are two blades 32, which number I have found to be most efficient in cutting the high weeds, said blades being made of flat metal, and having two cutting edges 32a, each extending straight across my attachment to form the cutting portion thereof. They are approximately the same width as the lawn mower reel 10, and at all times extend in front of said reel 10. At their lowest point in the circle of rotation they are higher than the bottom of said cutter reel 10, preferably by about 1½ to 2 inches, and at their highest point they are preferably higher than the top of said cutter reel 10. Said shaft 21 rotates in an anti-clockwise direction, which is the opposite direction from the regular lawn mower cutter reel.

By merely attaching the hook portion 16 of each arm 14 over the front bar 13 of any ordinary lawn mower and tightening the set screw 17 my attachment is ready for operation, and merely pushing the lawn mower 10 not only cuts the grass in the usual manner; but said shaft 21 is rotated and causes said blades to rotate in an anti-clockwise direction thereby also cutting the high weeds in the path of the lawn mower as well, thus doing the work of two machines at once with the same effort, and by an extremely simple and inexpensive attachment.

What I claim is:

An attachment for a lawn mover that has a cutter reel and drive wheel means, said attachment comprising rotatable cutter means embodying two blades spaced apart, supporting means connected to said rotatable cutter means and fastened to said lawn mower, friction wheel means connected to said cutter means and in contact with said drive wheel means and adapted to be rotated thereby, a portion of said rotatable cutter means being directly opposite a side of said drive wheel means, the maximum width between said two blades of said cutter means being less than the maximum width of said cutter reel, said blades at the lowest point during rotation of said cutter means being higher than the lowest point of said cutter reel.

CHARLES T. FISH.